United States Patent Office 2,996,134
Patented Aug. 15, 1961

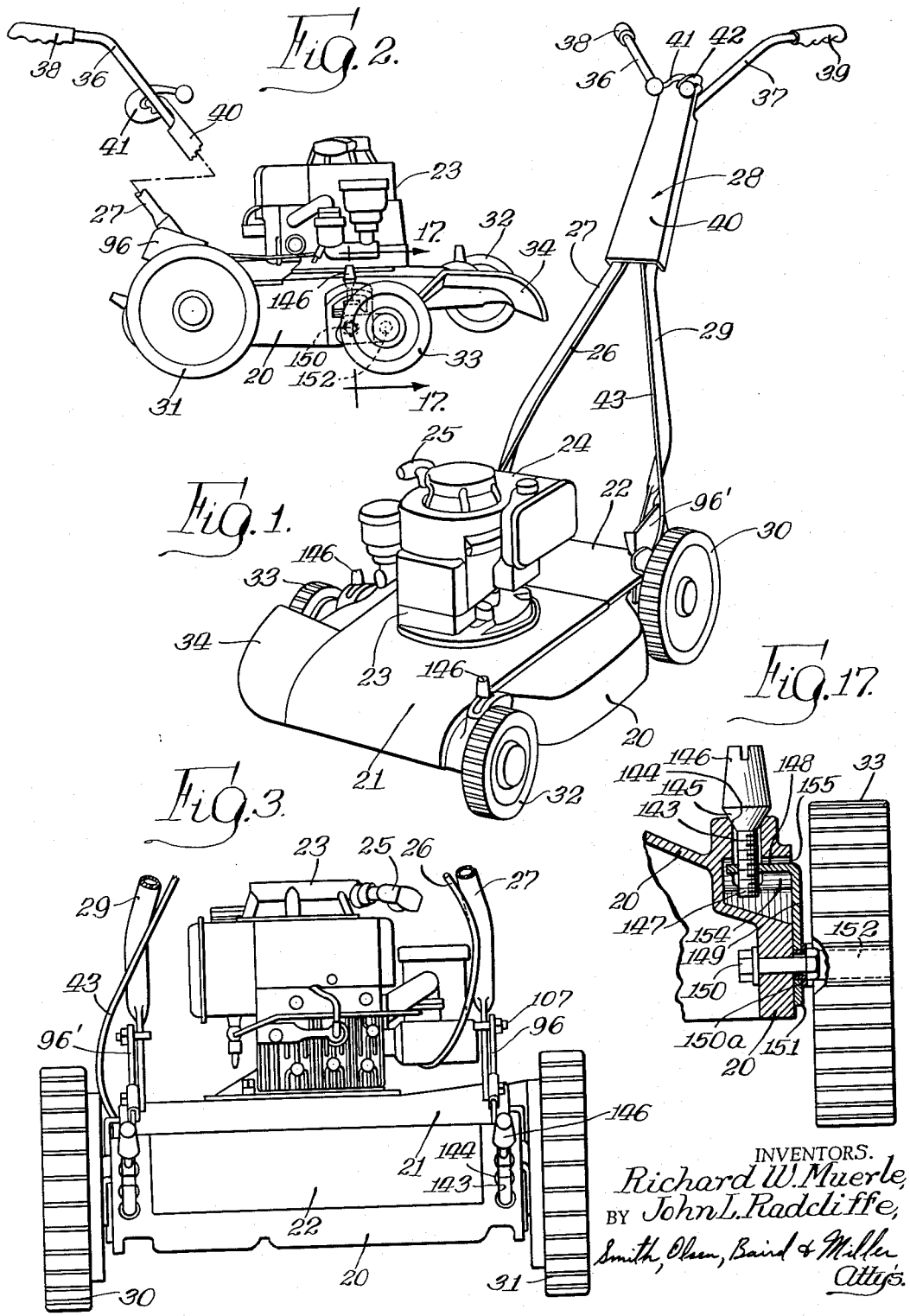
Aug. 15, 1961   R. W. MUERLE ET AL   2,996,134
SELF-PROPELLED LAWN MOWER
Filed May 6, 1957   6 Sheets-Sheet 1
INVENTORS.
Richard W. Muerle,
BY John L. Radcliffe,
Smith, Olsen, Baird & Miller
Attys.

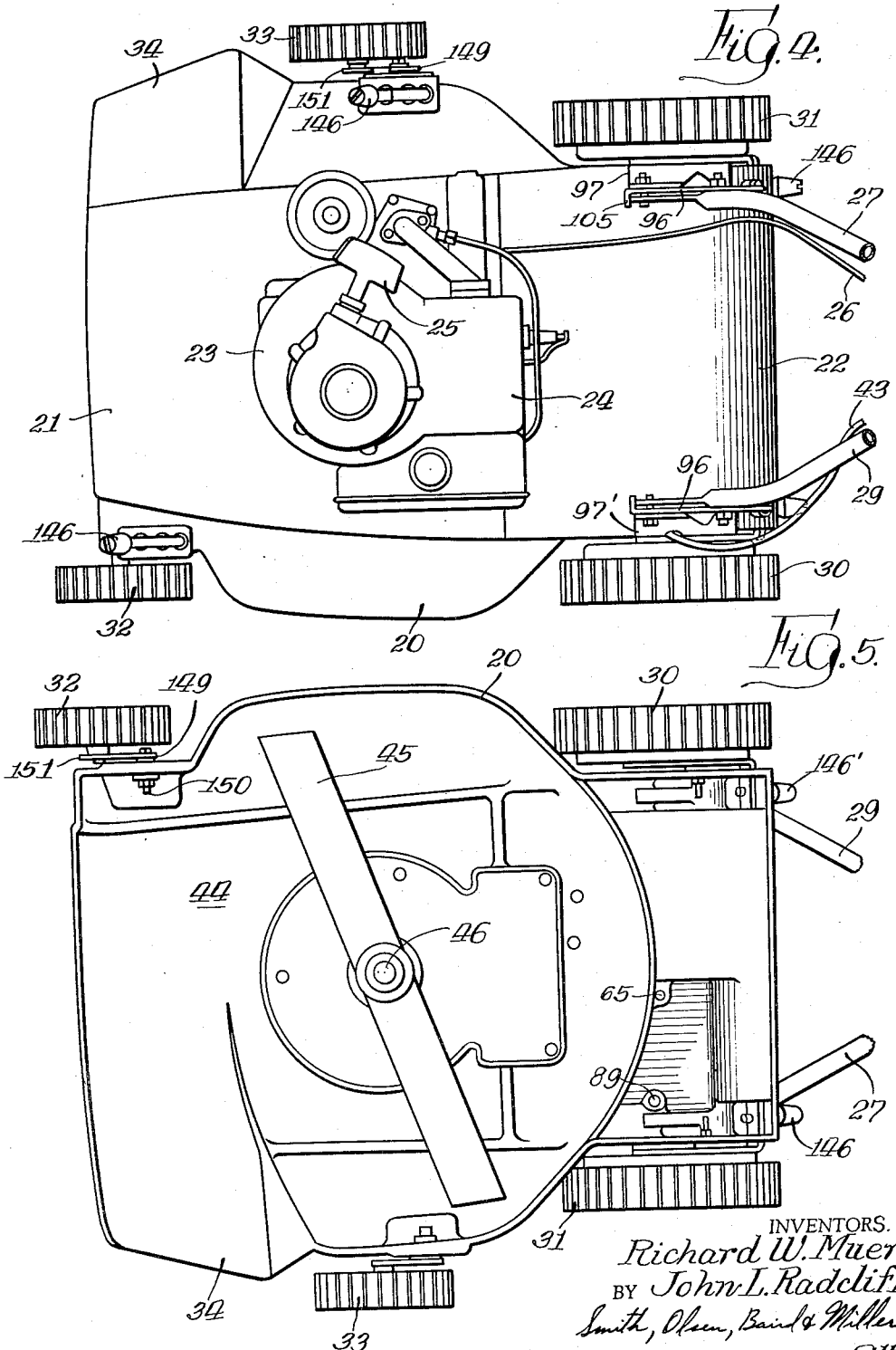

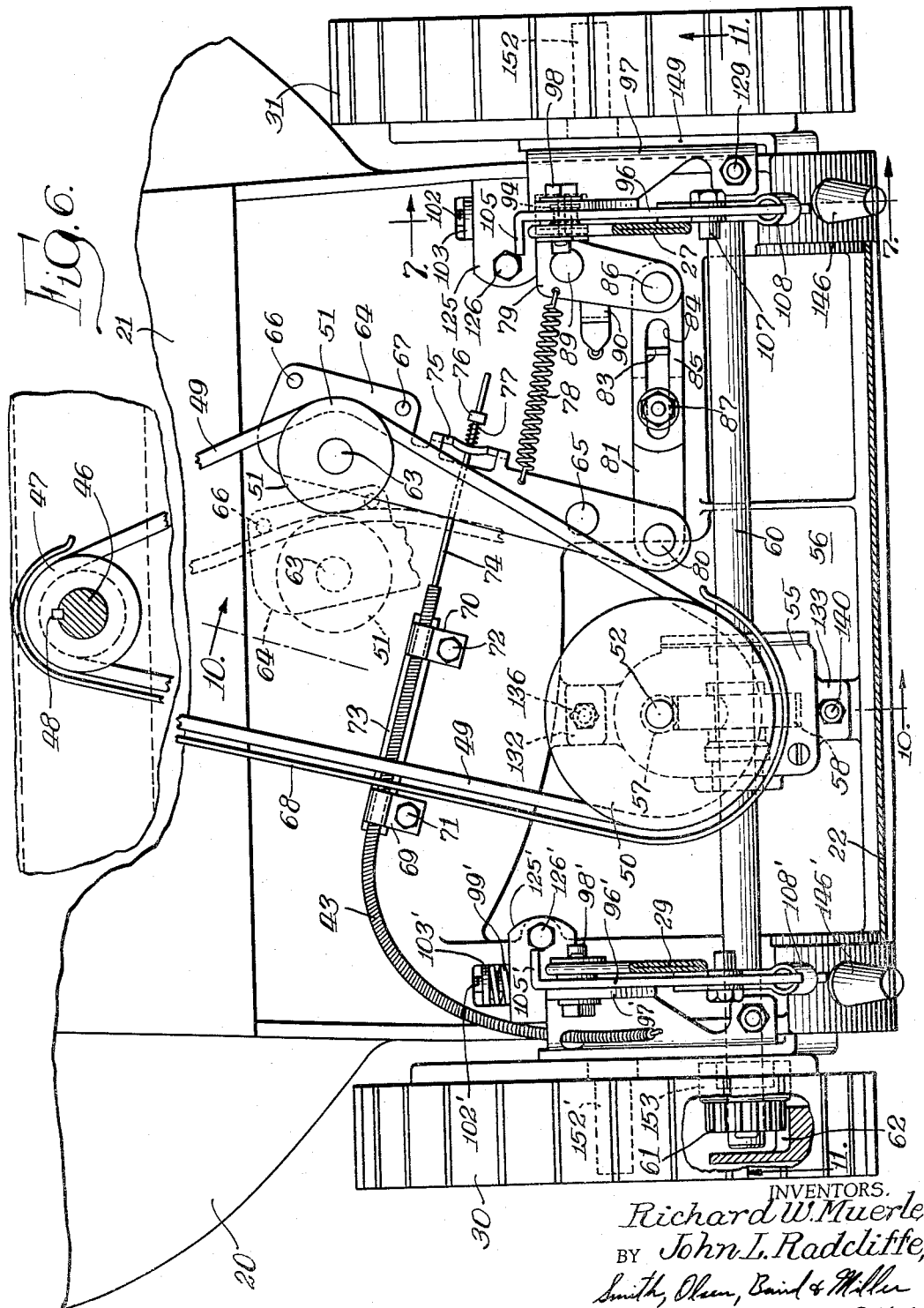

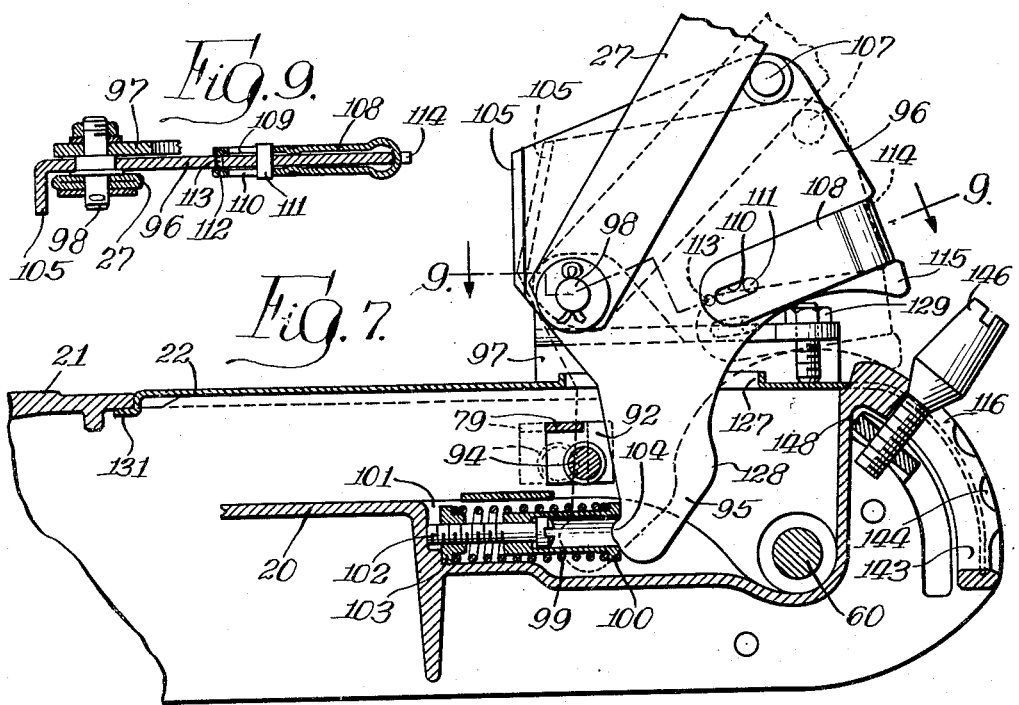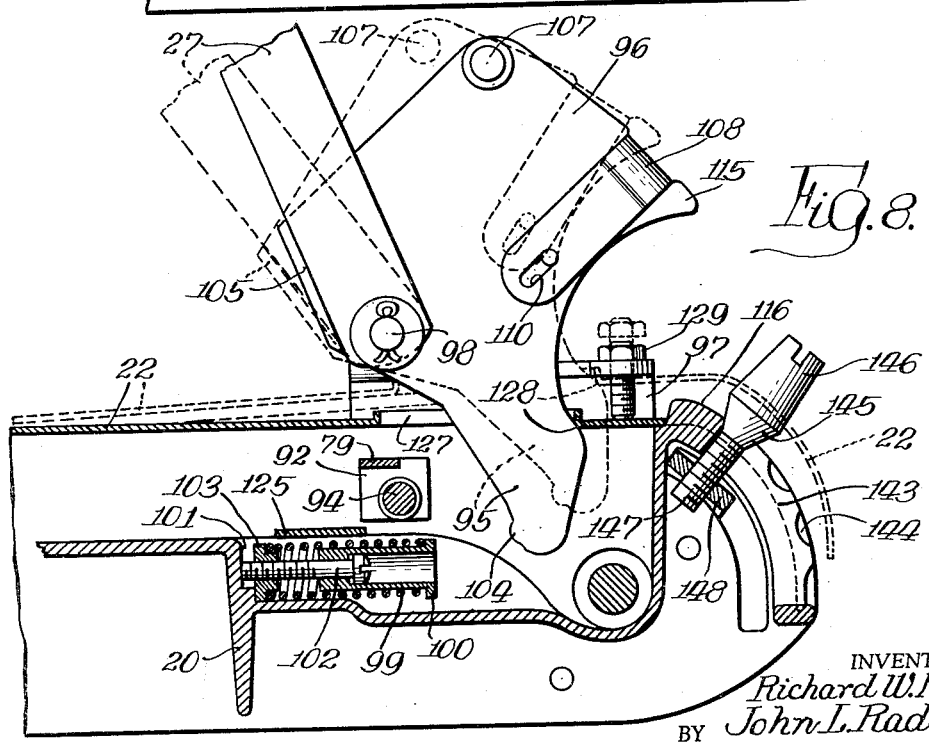

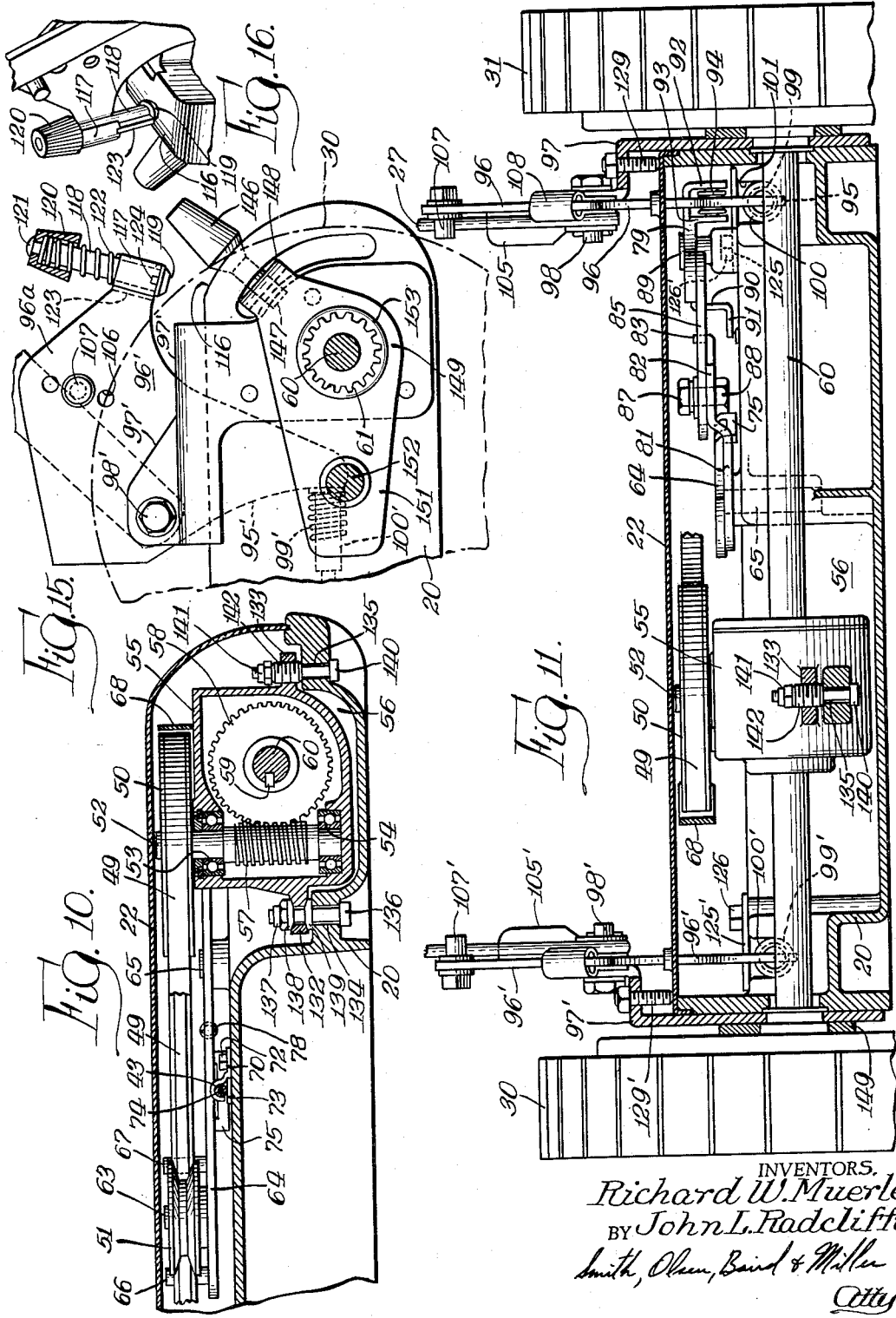

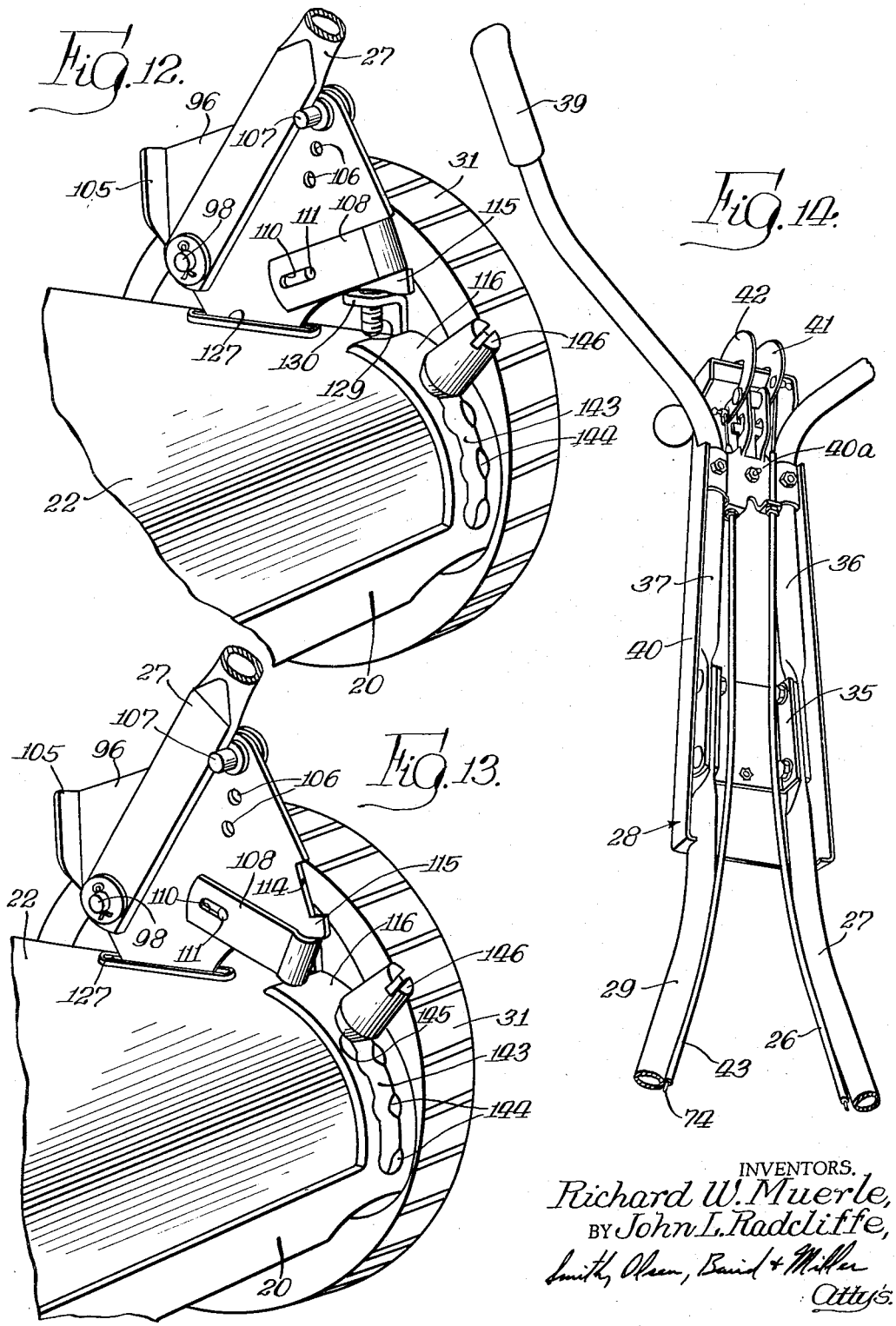

2,996,134
SELF-PROPELLED LAWN MOWER
Richard W. Muerle and John L. Radcliffe, Springfield, Ill., assignors to Montgomery Ward & Co. Incorporated, Chicago, Ill., a corporation of Illinois
Filed May 6, 1957, Ser. No. 657,108
9 Claims. (Cl. 180—19)

This invention relates to lawn mowers, and more especially to a self-propelled lawn mower having a rear wheel drive.

Self-propelled lawn mowers are known in the art, some of which have rear wheel propulsion and others front wheel propulsion. In recent years, front wheel drives have been favored for they facilitate trimming and other "close-in" operations which most frequently necessitate the raising of the front end of the mower. It will be apparent that where a front wheel drive is employed, propulsion is terminated when the front end of the mower is raised and, therefore, a single manual movement (namely, that of pressing down on the mower handles) accomplishes both a termination of the forward motion of the mower and an elevation of the front end thereof.

On the other hand, rear wheel propulsion offers the most positive traction even under most unfavorable cutting conditions, such as slight unevenness which exists on almost any lawn and causes bouncing of the front wheels which, of course, would minimize traction in a front wheel drive mower. In addition, there are inherent disadvantages with a front wheel drive and, conversely, advantages inherent in a rear wheel drive in the following respects:

Front wheel traction is almost completely ineffective on slopes and becomes progressively worse as the slope angle increases because the center of gravity of the mower shifts rearwardly when traversing the slope. If a turn is to be made with a front wheel drive, such wheels must be raised with the result that propulsion stops, and the operator must push the mower through the turn before the front wheels are again lowered and propulsion resumed. The front wheel drive also has necessitated the placement of the grass chute considerably rearward of the area where the largest volume of grass is being cut when a rotary mower blade is employed, whereby safety bars have been required at the end of the chute, which of course obstruct the chute and intensify the already excessive mulching of the grass which is evidenced by a waste of a large portion of available engine horsepower. Also, front wheel drives have resulted in a rather unattractive, extremely heavy and cumbersome design because of the extra drive sprockets, gears, etc. that must be employed, and because of the shift of weight toward the front end of the mower.

It is evident that even in view of the number of disadvantages in front wheel propelled mowers, considerable significance has been attached to the feature thereof which permits raising of the front end of the mower and terminating propulsion thereof in a single manual movement for, by and large, front wheel propulsion has been favored. It will be appreciated, however, that an improved lawn mower having this advantage and also the advantages of the rear wheel drive, would be an important contribution to the lawn mower art, and the provision thereof is one of the objects of this invention.

Another object of the invention is to provide a rear wheel propelled lawn mower that permits propulsion to be terminated and the front end of the mower to be lifted by the single manual movement of pressing the handles downwardly (which, it may be pointed out, is a natural tendency). Still another object is that of providing a rear wheel propelled lawn mower, having an handle-operated propulsion clutch equipped with an automatic lock-out so that control of the clutch is selective, and having also a handle-grip clutch control which provides an alternative means for terminating propulsion of the mower.

Yet a further object is in the provision of an improved wheel adjustment means which permits ready selection and setting of the cutting height, and which also eliminates the need for dust shields and other such devices to protect the wheel adjusting mechanism. Still a further object is in providing a self-propelled rear wheel drive lawn mower, wherein the driving mechanism is for the most part positioned within a well in the mower housing whereby such mechanism is completely hidden beneath the top deck thereof, making a neat appearing, weight balanced, manipulatable structure. Yet a further object is to provide a lawn mower of the character described, wherein a removable cover conceals the driving mechanism and is kicked off or released by a forward pivoting movement of the handle to afford access to such driving mechanism.

A still further object is in the provision of a lawn mower of the type described, wherein the mounting arrangement for the driving gears (or, more specifically, the gear box in which they are mounted) affords an automatic, positive alignment thereof with the axles in their correct orientation with respect to the wheels. Additional objects and advantages of the invention will become apparent as the specification develops.

Embodiments of the invention are illustrated in the accompanying drawings, in which:

FIGURE 1 is a perspective view of a lawn mower having the invention embodied therein;

FIGURE 2 is a side view in elevation of the mower;

FIGURE 3 is an enlarged, broken rear view in elevation;

FIGURE 4 is an enlarged, broken top plan view;

FIGURE 5 is an enlarged, broken bottom plan view;

FIGURE 6 is an additionally enlarged, broken horizontal sectional view, looking downwardly at the rear end portion of the mower generally from a plane just below the top deck thereof;

FIGURE 7 is a broken longitudinal sectional view taken along the line 7—7 of FIGURE 6;

FIGURE 8 is a broken transverse sectional view generally similar to that of FIGURE 7, but showing the handle structure pivoted forwardly to remove the cover plate that defines a portion of the top deck of the mower housing;

FIGURE 9 is a longitudinal sectional view as seen from the line 9—9 of FIGURE 7;

FIGURE 10 is a broken longitudinal sectional view as seen along the line 10—10 of FIGURE 6;

FIGURE 11 is a transverse sectional view taken along the line 11—11 of FIGURE 6;

FIGURE 12 is a broken perspective view showing the wheel adjustment and handle lock-out features of the invention;

FIGURE 13 is a broken perspective view substantially identical to that of FIGURE 12, but showing the lock-out mechanism in its blocking or lock-out position;

FIGURE 14 is a broken perspective view showing the underside of the handle structure and the operating control thereon;

FIGURE 15 is essentially a broken side view in elevation, but with portions of the structure shown in section and illustrating a modified form of lock-out device;

FIGURE 16 is a broken perspective view of the lock-out device illustrated in FIGURE 15, and showing such device in its blocking position; and FIGURE 17 is a broken vertical sectional view taken along the line 17—17 of FIGURE 2.

In describing the general construction of the lawn mower, reference will first be made to FIGURES 1 through 5 in particular, which show the mower having a housing 20 equipped with a top deck 21 having a separable rear portion or cover 22. Mounted on the top deck 21 is a power source 23, which in the specific illustration is a gasoline engine that may be completely conventional insofar as concerns the instant invention. Since it may be conventional, it is unnecessary to describe the various components thereof, but for reference it may be noted that the engine has a fuel tank or container 24, a manual pull-type starter 25, and a throttle or speed control 26 that may be a Bowden wire having the outer coaxial sheath thereof secured to the leg 27 of the lawn mower handle, which in general is designated with the numeral 28 and is seen to have a leg 29 corresponding to the leg 27.

The mower is also provided with rear wheels 30 and 31, and front wheels 32 and 33, the wheel 33 being offset toward the center of the housing which then defines a grass chute 34 forwardly of that wheel. To return to the handle structure, it will be noted by referring to FIGURE 14 that the legs 27 and 29 converge and are secured at their upper ends by bolts to a generally U shaped channel 35, having also secured thereto the handle leg extensions 36 and 37 which flare outwardly at their upper ends and are turned downwardly and provided with handle-grips 38 and 39, respectively, at the ends thereof.

Such interconnection between the handle segments is concealed from the upper side thereof by a shield 40 of generally U-shaped configuration which also conceals a bracket 40a that is connected between the handle extensions 36 and 37 and pivotally carries at its upper end a lever 41 coupled to the inner wire of the throttle control 26 so that manipulation of the lever changes the throttle control for the engine 23. It is also apparent that a corresponding pivotally mounted lever 42 is carried by the bracket 40a, and it is connected to the inner draw wire of a handle-grip clutch control 43 that may also be a Bowlen wire, and which functions in a manner to be described hereinafter to actuate a clutch mechanism that disengages the engine 23 from the rear wheel drive of the mower.

The lawn mower is of the rotary type, and as seen in FIGURE 5 the housing 20 defines a compartment 44 on the underside thereof in which is positioned a cutting blade 45 which is mounted on a shaft 46 suitably journaled for rotation in bearings and connected to the engine 23 so as to be rotatably driven thereby. The blade 45 rotates in a counter-clockwise direction as viewed in FIGURE 5, so that the grass cut thereby is forced outwardly through the chute 34 almost immediately upon its being severed so that mulching is substantially eliminated. The shaft 46 is in driving engagement with the engine 23 at all times so that the blade is rotated whenever the engine is in operation.

However, the engine 23 is selectively coupled in a driving relation with the rear wheels 30 and 31 through a propulsion clutch assembly which will now be described, so that forward motion of the lawn mower is under control of the operator. In describing the clutch assembly, reference will be made in particular to FIGURES 6, 10 and 11. It is seen in these figures that the driveshaft 46 which is rotatably driven by the engine 23, has a pulley wheel 47 constrained thereon so as to prevent relative rotation therebetween by a key 48. Entrained about the drive pulley wheel is a belt 49 which also traverses an enlarged pulley wheel 50 and a pulley wheel 51 which is substantially of the same diameter as that of the drive pulley 47. The pulley wheels 47, 50 and 51 may be of conventional construction, having generally V-shaped peripheral channels thereabout dimensioned to receive the generally V-shaped belt 49 therein.

The pulley wheel 50 is locked on a worm gear shaft 52 journaled for rotation in bearings 53 and 54 carried by a gear box 55 which nests within a well 56 provided by the housing 20. Intermediate its ends, the shaft 52 is equipped with a worm gear or helical pinion gear 57 in meshing engagement with an enlarged drive gear 58 secured by a key 59 on the rear axle 60 which, as is most apparent from FIGURE 6, is equipped at each end with a drive pinion 61 that drivingly engages a ring gear 62 provided within the interior of each of the rear drive wheels 30 and 31. It will be apparent from this description that when the belt 49 is driven through the drive pulley 47, the enlarged pulley wheel 50 will be rotated whereupon the shaft 52 and its gear 57 will be rotated to turn the drive gear 58 and, as a consequence, the axle 60 and rear wheels 30 and 31 through the driving engagement of the drive pinions 61 with the wheel or ring gears 62.

The pulley wheel 51 is a take-up pulley, and comprises a part of the clutch assembly for it is selectively movable between the positions shown by the full lines and the broken lines in FIGURE 6. To accommodate such bodily movement of the clutch or take-up pulley wheel 51, it is rotatably carried by a stub shaft 63 mounted on a clutch arm or plate 64 which is supported for pivotal movement intermediate the ends thereof on a pivot shaft 65 mounted on the housing 20. It will be noted that the clutch arm 64 adjacent but spaced slightly from the pulley wheel 51, is equipped with a pair of upright pins 66 and 67 which serve to hold a belt 49 within the channel of the pulley wheel when the plate is pivoted in a counter-clockwise direction as seen in FIGURE 6, such position being shown by broken lines. Also, a belt guide or guard 68 extends along the belt 49 between the pulley wheels 47 and 50 and partially encloses them for the same reason, namely that of maintaining the belt in alignment with the pulley wheels for automatic reengagement therewith when the clutch is engaged—that is, when the arm is in the position illustrated by the full lines in FIGURE 6.

The guard serves a further and possibly more important function in insuring full driving disengagement of the belt 49 from both pulley wheels when the clutch arm 64 is moved to the disengaging position shown by the broken lines in FIG. 6. During this movement the pins 66 and 67 push the right-hand run of the belt to the left, as viewed in FIG. 6, thereby rendering the belt quite slack and causing the left-hand run of the belt also to be moved to the left. The guard 68 limits this movement of the left-hand run and thus prevents a wide movement of one end portion of the belt that might disengage that end portion from the adjacent pulley but leave the other end in engagement with the other pulley. By preventing the accumulation of excessive slack toward one end of the left-hand run of the belt, the guard 68 insures effective disengagement of the belt from both pulleys.

The clutch arm is swung about the pivot shaft 65 to effectuate a disengagement of the clutch by one of two arrangements. The first concerns the handle-grip clutch control 42 and control wire 43 heretofore referred to, which is seen in FIGURE 6 to have an outer sheath which is clamped to the housing 20 by means of fasteners 69 and 70 which are drawn tightly against the housing by the respective cap screws 71 and 72 whereby an anchorage of the outer sheath of the control cable is afforded between the respective fasteners and a clamp jaw 73 integrally formed on the inner floor of the housing 20. The inner draw wire of the cable 43, which for identification is denoted with the numeral 74, extends through an aperture provided therefor in an abutment 75 carried by the pivotal clutch arm 64. The draw wire 74 has an adjustable stop 76 fixed thereon, and interposed between the stop and abutment there is a relatively light or weak coil spring 77. The arm 64 is seen to be biased toward the right or in a clockwise direction, by a helical spring 78 which at one end thereof is secured to the arm and at the other end is secured to a bell crank 79.

With this arrangement, the arm 64 is biased by the spring 78 in a direction such that the clutch pulley 51 bears against the belt 49 to effectuate a driving engagement through the belt between the drive pulley 47 and driven pulley 50. When the clutch control lever or handle-grip control 42 is pivoted downwardly, or generally in a clockwise direction as seen in FIGURE 1, the draw wire 74 is moved so as to swing the clutch arm 64 in a counter-clockwise direction about the pivot axis thereof defined by the shaft 65 to loosen the belt 49, whereby the clutch is disengaged and propulsion of the lawnmower will be terminated because the loosened belt 49 cannot effectuate a transfer of torque between the rotating drive pulley 47 and the pulley wheel 50.

The second arrangement for disengaging the clutch accomplishes the same results just described—namely, that of pivoting the clutch arm 64 so as to loosen the belt 49—but the control of such movement is provided through the handles 28 of the mower. Again referring to FIGURES 6 and 11, it will be seen that the clutch arm 64 is pivotally connected by an enlarged pin 80 to a link 81 that is bifurcated along one end portion thereof to define spaced legs 82 that define an elongated slot therebetween and which merge adjacent their ends and terminate in an upwardly turned stop 83 which is dimensioned so as to be snugly received within an elongated slot or channel 84 provided by a link 85 that at one end thereof is rotatably coupled to the bell crank 79 by an enlarged pivot pin 86.

The link 85 and the slotted portion of the link 81 are in overlapping, facing relation, and are rigidly secured together by a bolt 87 which extends through the corresponding slots of the links and draws them into tight frictional engagement by means of a nut 88 with which it is equipped. It will be apparent that this arrangement permits adjustment of the links 81 and 85 so as to position the clutch arm 64 and pulley wheel 51 for proper clutching manipulation. The stop 83 prevents relative rotation between the links 81 and 85 about an axis defined by the bolt 87.

The bell crank 79 is pivotally mounted on a pivot pin 89, and is equipped along one branch or arm thereof with a depending leg 90 turned laterally as at 91, and along its other arm with spaced, parallel legs or flanges 92 and 93 that rotatably support a roller 94 therebetween. The roller 94 is adapted to be engaged by a depending end or extension 95 of a swing plate 96 that is pivotally supported by a swing plate mounting bracket 97 rigidly carried by the housing 20 and extending upwardly above the top deck thereof. The swing plate is supported on a pin 98 having a washer and cotter pin assembly on one side thereof, and a washer and nut on the other side thereof. It may be noted that the handle 28 of the mower controls pivotal movement of the swing plate, and that the handle leg 27 is also pivotally supported on the pin 98.

With the arrangement just described, pivotal movement of the swing plate 96 in a clockwise direction, as viewed in FIGURES 7 and 8, will bring the depending extension 95 thereof into engagement with the roller 94; and continued movement of the swing plate in the same direction will cause the bell crank 79 to pivot in a counter-clockwise direction, as seen in FIGURE 6, about the axis defined by the pivot pin 89 whereupon the links 81 and 85 will be shifted toward the right to move the pulley wheel 51 away from the belt 49, thereby disengaging the clutch. When the swing plate is rotated in an opposite direction to withdraw the extension 95 from the roller 94, the coil spring 78 will effectuate a reengagement of the clutch. In this respect, it may be noted that the spring 78 is connected to the bell crank 79 in substantial alignment with the pivotal axis thereof, so that there is little tendency for the force of the spring 78 to rotate the bell crank in either direction.

Normally, the swing plate 96 is resiliently held in spaced relation with the roller 94, as shown in FIGURE 7, by means of a relatively strong coil spring 99 that seats at one end against a laterally extending flange provided by a plunger 100, and at its opposite end against a shoulder of a nut 103 that is threaded on a bolt 102 which extends through the plunger and guides the plunger for movement along its longitudinal axis. The plunger 100 and the spring 99, together with the nut 103 and the bolt 102, comprise a spring cartridge or assembly that resides in a recess 101 in the casing 20, with the inner end of the bolt being in engagement with the adjacent wall of the casing as shown. Thus, it will be understood that the spring 99 may be maintained in a state of compression at all times by properly adjusting the bolt and nut. The plunger is slidable along the bolt 102, and has a hollowed end adapted to have the spring plate extension 95 bear thereagainst and to receive a protuberance 104 therein which is carried by the extension, as shown in FIGURE 7.

It will be noted from FIGURE 11 that a corresponding spring assembly and swing plate arrangement are also provided at the opposite side of the mower adjacent the wheel 30, and the operation is the same as that already described, the only exception being that this swing plate performs no function in the actuation of the clutch assembly. Since the structural components are identical with those heretofore described, they will be designated with the same numerals, but for clarity will be primed.

Each swing plate is equipped along its forward edge with a laterally turned abutment wall 105 adapted to be engaged respectively by the legs of the mower handle 28 when the handle is swung forwardly, or in a counter-clockwise direction as viewed in FIGURE 8, which shows such abutment by broken lines. Along the rear edge thereof, each swing plate (as shown most clearly in FIGURES 12 and 13) is provided with a plurality of apertures 106 therein which are adapted to selectively receive a stop pin 107 which projects through the swing plate and is adapted to be abutted by the legs of the handle. It will be evident that the apertures or openings 106 are arranged so as to provide an adjustment for the normal operating height of the mower handles.

When the handle legs are in engagement with the pins 107, a downward force on the handles will tend to pivot the legs thereof downwardly about the pivotal axes defined by the pins 98 and, of course, such force will tend to pivot the swing plates about the same respective axes. Movement of the handles and swing plates in this direction is resisted by the helical springs 99, and the resistive force afforded thereby is sufficient to maintain the swing plate 96 and its extension 95 in spaced relation with the roller 94 so that the lawn mower can be propelled forwardly for normal operation thereof. However, when the downwardly directed force applied by the operator to the handles is increased, the coil springs 99 will compress, whereupon the swing plate 96 will engage the roller 94 and the clutch will be disengaged as heretofore described.

A lock-out arrangement is included in the structure so that the handles can be selectively constrained against downward movement irrespective of the magnitude of the force applied thereto, at a position such that the clutch will not be disengaged. A lock-out arrangement is illustrated in FIGURES 7 through 9, 12 and 13, and is seen to comprise a generally U-shaped clip 108, the respective legs of which are provided with aligned, elongated slots 109 and 110 that slidably receive therein a pin 111 rigidly carried by the swing plate 96. If reference is made to FIGURE 9 in particular, it will be seen that the end portions of the U-shaped clip are turned inwardly as at 112, and are receivable within a small opening 113 provided therefor in the swing plate. Further, the swing plate has a recess 114 along the rear edge thereof dimensioned to receive the base of the U-shaped clip therein. The recess, opening 113 and length of the clip 108 are dimensionally related so that the inwardly turned ends 112 will seat within the opening 113 when the recess 114 receives the base of the clip therein. Such an arrangement then tends to hold the clip in an inoperative position so that the clutch assembly can be actuated by the lawn mower handles.

On the other hand, the clip 108 can be moved longitudinally to withdraw both the base thereof from the recess 114 and the inwardly turned ends thereof from the opening 113 to an extent permitting the clip to be moved beneath a shoulder 115 provided by the swing plate 96. The clip then serves as a stop preventing rotation of the swing plate 96 in a downward direction, because on one side it abuts the shoulder 115 of the plate and on its other side the arcuate edge 116 of the mower housing. At this time, the clip is functioning as a lock-out whereby the clutch assembly is removed from the control of the lawn mower handles. An identical structural assembly of elements is provided along the opposite side of the lawn mower adjacent the wheel 30, and such components will be designated with the same numerals, but for separate identification each has been primed.

A modified lock-out assembly is illustrated in FIGURES 15 and 16, and in this form of construction the swing plate (which is denoted with the numeral 96a) is equipped along the rear edge thereof with a tubular portion 117 that slidably receives a lock-out pin 118 therein, provided at its lower end with an enlarged head 119 and at its upper end with a knob 120 that may be secured thereto by a cap screw 121 or by other suitable means. Surrounding the upper end of the pin 118 is a coil spring 122 that biases the pin upwardly and into the position shown in FIGURE 15. The lower end portion of the pin is provided with a pair of integral splines 123 that are slidably receivable within ways provided therefor in the tubular portion 117. At its lower end, the tubular portion 117 has a notch 124 at diametrically opposite points thereon dimensioned to receive the upper ends of the respective splines 123 therein, as shown in FIGURE 16.

Corresponding to the pair of lock-out clips 108 heretofore described, there will be a lock-out pin assembly for each of the swing plates. It will be evident that when the pins are in the uppermost position illustrated in FIGURE 15, they will be ineffective to block declutching when the swing plates are pivoted downwardly. On the other hand, when the pins have been pressed downwardly with respect to the tubular portions 117 and rotated through 90° to align the splines 123 with the notches or recesses 124, the pins will be held in extended positions whereat the enlarged heads 119 thereof will engage the arcuate portions 116 of the housing when the swing plates are pivoted downwardly so that no declutching will occur on handle movement.

It will be desirable to provide an arrangement for adjusting the resistive force afforded by the coil springs 99 and 99' to downward movement of the lawn mower handles, and this may be accomplished with the construction shown by rotating the bolt 102 to move the nut 103 therealong, whereupon in one direction of movement of the nut, the spring is compressed to increase the resistive force afforded thereby, and rotation in the opposite direction decreases the spring force. FIGURES 7 and 8, particularly in conjunction with FIGURE 11, show that the spring cartridges or assemblies are held in place by plate clamps 125 and 125' which are secured to the housing by the respective cap screws 126 and 126'.

Reference to FIGURES 7, 8, 12 and 13 makes it clear that the section of the top deck which is defined by the cover 22 is provided along each side thereof with an elongated slot or channel 127 which may have a perimetric edge extending upwardly thereabout. The slots 127 ordinarily receive the lower end portions of the swing plates therein, and are sufficiently long so as to permit free pivotal movement of the swing plate extensions therein. However, when the lawn mower handle structure 28 is swung forwardly to pivot the swing plates 96 in a counter-clockwise direction as viewed in FIGURE 8, a protuberance or cam surface 128 provided by each of the swing plates, engages the rear termini of the slots 127 thereby tending to move the cover upwardly and rearwardly and into the position shown by dotted lines in FIGURE 8. The swing plates are effective to accomplish such movement of the cover, provided that first the clamp bolts 129 which are threadedly carried by inverted, generally L-shaped extensions 130 of the brackets 97 and 97' and which normally bear against the cover to lock it in position on the housing, are released from the cover— that is, are screwed upwardly and into the position thereof shown in phantom in FIGURE 8.

Except for the clamp bolts 129, the cover is secured to the housing only by the edge 131 which, as seen in FIGURE 7, extends under the forward section of the rigid top deck 21. Thus, the swing plates cam the cover rearwardly and upwardly, and continued movement of the swing plates in the counter-clockwise direction withdraws the depending or extended ends 95 thereof completely from the slots 127. The cover can then be lifted off the housing to provide access to the clutch and drive mechanisms heretofore described.

A mounting arrangement for the gear box 55 and axle 60 is provided which simplifies the placement and securance thereof in the housing, and which accommodates variations in the components that may arise because of manufacturing tolerances, etc., while still affording a true and positive alignment of the axle 60 with the bearings therefor, and with the pinions 61 carried by the axle with the ring gears 62 of the rear drive wheels. The mounting arrangement referred to will be seen most clearly in FIGURES 10 and 11. It is apparent from these figures that the gear box 55 is equipped on opposite sides thereof with outwardly extending ears 132 and 133 that have apertures therein alignable, respectively, with the openings 134 and 135 in the housing 20 adjacent the well 56 thereof. Extending through the opening 134 is a threaded bolt 136 that also extends through the opening in the ear 132 and is provided at its upper end with a nut 137.

Inspection of FIGURE 10 reveals that the ear 132 has along opposite sides thereof generally semi-spherical recesses that are adapted to have seated therein the corresponding generally semi-spherical surfaces of washers 138 and 139. It will be noted that these washers have flat, planar surfaces opposite the arcuate surfaces thereof, which are adapted to bear against the nut 137 and housing 20, respectively. Extending through the opening 135 is a bolt 140 that threadedly receives at its upper end a nut 141. The shank of the bolt 140 freely extends through a hollow, externally threaded sleeve 142 that is threadedly received within the opening provided in the ear 133.

This particular bolt arrangement permits mounting of the gear box 55 in the following manner: First, the axle 60 is appropriately mounted in the housing and is supported in the bearings provided therefor in plates 97 and 97'. At this time, the gear box 55 is floating freely on the axle and is not otherwise supported. The ears 132 and 133 will, of course, be located so that the openings therethrough are in alignment with the respective openings 134 and 135 in the housing. Next, the washers 138 and 139 are placed, as shown, in relation to the recesses in the ear 132, the bolt 136 is extended upwardly therethrough, and the nut 137 finger-tightened on the bolt. Tightening the nut in such manner properly orients the gear box 55 in relation to the alignment requirements of the axle 60 because of the semi-spherical character of the washers and the recesses in which they seat. Further, the opening 134 and the corresponding opening in the ear 132 are substantially larger than the diameter of the bolt 136 so that the bolt does not interfere with the seating of the washers relative to the ear 132.

Following these steps, the externally threaded sleeve 142 is screwed into the ear 133, and the sleeve is brought to bear against the housing. The nut 141 is then tightened on the bolt 140 which rigidly constrains the sleeve 142 against rotation, and since the gear box 55 cannot rotate with respect thereto, it is fixedly secured on the housing and without imparting any lateral stresses or twisting forces to the axle 60.

Each of the wheels is mounted for adjustment thereof with respect to the housing 20 so as to afford selection of the cutting height of the mower. The adjustable support for each wheel is identical, and in describing the adjustable mounting structure, initial reference will be made to FIGURES 5, 12, 13, 15 and 17. FIGURES 12 and 13 show clearly that the housing edge portion 116 is arcuate, and has an elongated slot or channel 143 formed therein that is provided at spaced apart points therealong with lateral, generally arcuate enlargements 144 arranged in aligned pairs. These enlargements are adapted to have the generally frusto-conical end portion 145 of a bolt head 146 seat therein.

As is most evident from FIGURE 17, the threaded shank 147 of the bolt projects beyond the inner side of the slot 143, and is threadedly received within an opening provided therefor in the laterally turned leg 148 of a bell crank or wheel support bracket 149 which is pivotally mounted on the housing 20 by a shoulder bushing 150a and a nut and bolt assembly 150 which defines the pivotal axis thereof. Referring now to FIGURE 15, it is apparent that the wheel support bracket 149 for each wheel has a forwardly extending leg 151 equipped with a stub shaft 152 rigid with respect thereto and extending outwardly therefrom. The shaft 152 defines an axle for one of the wheels. That is to say, each of the wheels is adjustably supported by a bracket or bell crank 149 and is rotatably mounted on the shaft 152 thereof. In the case of the two front wheels, each support bracket 149 is pivotally mounted on a nut and bolt assembly 150, as described above and as best shown in FIG. 17, so that pivotation of the support brackets will raise or lower the front wheels. In the case of the support brackets 149 for the back wheels, however, each bracket is rotatably mounted upon a suitable bushing carried by the axle 60 (FIG. 11), or upon a cylindrical extension of the same bearing bushing which journals the axle in the main housing 20, so that the axis of pivotation of each rear bracket 149 is coincident with the axis of the axle.

With the described arrangement, the wheels are adjusted by loosening the locking screw comprising the threaded shank 147 and head 146 thereof to withdraw the head end portion 145 from the seats 144, whereupon the bell crank 149 may be pivoted about its bolt axis 150, or about the axle 60 in the case of the rear wheels, with the result that the axle or stub shaft 152 is either moved upwardly or downwardly with respect to the housing 20 depending upon the direction of movement of the bell crank. Consequently, since the position of the wheels with respect to the ground is fixed, such pivotal movement of the bell cranks necessarily raises or lowers the housing with respect to the ground and thereby establishes the cutting height of the rotary blade 45. The adjusted position of the wheels is maintained by tightening the locking screws so as to seat the frusto-conical ends 145 thereof in the selected recesses 144. It is believed that the foregoing description of the wheel adjusting assemblies will be more evident with reference to the drawings if each of the individual assemblies is not separately numbered, and therefore the corresponding parts of each assembly have the same numerals applied thereto.

Some additional comments may be helpful with respect to the height adjustment of the rear driving wheels 30 and 31 since such adjustment may be freely made without disturbing the driving connection thereof with the axle 60. The interrelation is shown most clearly in FIGURE 6, which makes it apparent that relative motion between the wheel 30 and the housing 20 through the limited arc defined by the elongated slots 143 simply shifts the location of the drive pinion 61 along the inner circumference of the ring gear 62 without causing the drive pinion and ring gear to become disengaged. It may be noted that the drive pinions 61 are equipped with pawls or overriding clutches 153 of a conventional type to permit different respective rotational velocities of the rear wheels 30 and 31 so that the mower can be readily manipulated through turns, etc. Overriding clutches being well known and old devices for accomplishing such results, no detailed illustration thereof is provided in the drawings, and no further description thereof will be set forth.

*Operation*

The lawn mower is placed in operation by first starting the engine 23, which in the structure of the specific illustration is accomplished through a pull crank 25. However, the engine is first declutched from the rear drive wheels by appropriate setting of the lever control 42, which through the Bowden wire 43 (and more particularly, through the inner pulley wire 74 thereof) swings the arm 64 and pulley wheel 51 in a counter-clockwise direction, as viewed in FIGURE 6, to slacken the belt 49. After the engine is running, propulsion of the lawn mower is initiated by engaging the clutch through return of the lever 42 to its prior position.

If it is desired to maintain clutch control through the handle grip lever 42, the lock-out clips 108 are positioned as shown in FIGURE 13 to limit downward movement of the handle assembly and of the swing plates 96 and 96' controlled thereby. The lock-out clips when so positioned enable the front end of the lawn mower to be elevated without terminating the driving connection between the engine and rear wheels when the handles are pushed downwardly. On the other hand, if it is desired to control the propulsion of the lawn mower through the handle assembly, the lock-out clips 108 are placed in the position therefor illustrated in FIGURE 12, and they are held in such position by the interlock afforded through the tongues 112 thereof and the respective slots 113 of the swing plates (FIGURE 9).

The lawn mower may be manipulated in a conventional manner through the handle structure, for the handles and the respective swing plates are constrained from a declutching position by the relatively stiff coil springs 99 (FIGURES 7 and 8). As brought out hereinbefore, the resistive force of the coil springs is adjustable by means of the screws 102 which then enables the operator to tailor the amount of the constraining force applied thereby to the handles as necessary. However, when the handles are pushed downwardly with a force sufficient to elevate the front end of the mower, the springs 99 compress with the result that the swing plate 96 engages the roller 94 to urge it forwardly. Such forward movement pivots the bell crank 79 about the axis 89, drawing the links 81 and 85 in a direction such that the plate 64 pivots in a counter-clockwise direction, as viewed in FIGURE 6, to release the tension in the belt 49 and declutch the engine from the wheels. Propulsion is again initiated when the downward force on the handles is removed, whereby the coil springs 99 return the swing plates and the handles to their normal positions.

The operating height of the handle assembly 28 is selectively adjustable through placement of the pins 107 in one of the apertures 106 in each of the swing plates. The cutting height of the mower is also selectively adjustable in a similar simple manner by successively loosening the bolt 147 of each wheel assembly and swinging the bell crank 149 to the desired position, which is thereafter maintained by tightening the bolt to seat the end 145 of the head 146 thereof in one of the recesses 144.

By referring to FIGURE 17, it will be noted that the housing 20 is constructed so as to provide an integral dust cover or protector for the wheel mounting assemblies. That is to say, the housing 20 is cast so as to have an enlarged chamber 154 adjacent each wheel which is in open communication with the channel 143 which passes the bolt 147 therethrough, and has a lateral opening 155 through which the arm 148 of the bell crank 149 extends. The opening 155 is slightly arcuate so as to enable the arm 148 to pass freely therethrough during wheel adjustment. It is apparent that the chamber 154 being completely closed except for the openings thereinto afforded by the channel 143 and opening 155, effectively shields the wheel adjusting assembly from dirt, grass and other materials.

Access to the interior of the housing to check the operating mechanism and service the same, and also to permit preloading adjustment of the coil springs 99 and adjustment of the length of the clutch-actuating links 81 and 85, is afforded by removal of the housing cover 22 which is accomplished by first loosening the bolt 129 on each side of the housing, and thereafter pivoting the handle assembly 28 forwardly which kicks off the cover through the camming relation of the edge 128 of each swing plate with the rear ends of the slots 127 in the cover. Such forward movement of the handle assembly ultimately pivots the extensions 95 of each swing plate to a position withdrawn from the slots 127 and above the cover, whereby it is then readily removed. Replacement is effected by reversing the movements described; and it will be evident that when the cover is in place, all of the driving mechanism with the exception of the engine 23 is below the top deck of the mower.

The description herein set forth makes it apparent that the lawn mower of this invention is an attractive unit that is well balanced and easily manipulated since the center of gravity is adjacent the rear wheels because of the placement of the driving and clutch mechanisms. Since the grass chute is adjacent the forward end of the mower, there is no available engine power wasted in mulching the cut grass prior to its discharge. In addition, the mower combines in a single unit the operational advantages heretofore separately attainable only in the front wheel or rear wheel driven mowers, but without the disadvantages heretofore inherent in each.

While in the foregoing specification embodiments of the invention have been set forth in great particularity for purposes of providing an adequate disclosure thereof, it will be apparent to those skilled in the art that numerous changes may be made in such details without departing from the spirit and principles of the invention.

We claim:

1. In a power driven lawn mower having a housing provided with a well therein containing drive mechanism and with a removable cover for such well, said cover having elongated, parallel slots respectively adjacent the sides thereof, a pair of swing plates pivotally mounted on said housing adjacent said slots and having depending extensions normally projecting therethrough, a handle structure providing a pair of legs respectively adjacent said swing plates and supported by said housing for pivotal movement about the pivot axes of said swing plates, said swing plates being equipped along the forward edge portions thereof with abutments oriented for engagement by said legs when said handle structure is pivoted theretoward to effectuate a corresponding pivotal movement of said swing plates, said extensions each having a cam surface along the rear edge thereof engageable with the respective rear termini of said slots when the swing plates are pivoted forwardly beyond a predetermined location for lifting said cover upwardly and rearwardly, said extensions and slots being dimensionally interrelated so as to afford withdrawal of said extensions during continued forward pivotal movement of the swing plates after said cover has been so lifted upwardly and rearwardly, whereby said cover can then be freely removed to afford access to the interior of said well.

2. In a self-propelled lawn mower having a housing equipped with front and rear wheels and with an engine mounted thereon, said housing providing an enlarged compartment therein, drive connection means including a clutch mounted within said compartment for transferring power from said engine to said rear wheels, a removable cover enclosing said compartment, said cover having a pair of elongated slots therein positioned along the respective rear wheels and in parallel alignment with each other, means for selectively disengaging said clutch and for removing said cover, comprising a pair of swing plates carried by said housing for pivotal movement about an axis extending transversely of said housing, said swing plates being aligned respectively with said slots and having extensions depending therethrough, a handle structure having a pair of legs carried for swinging movement about said pivot axis adjacent the respective swing plates, forward and rear abutment means provided by each of said swing plates for selective engagement by said legs for initiating pivotal movement of said swing plates in alternate directions, one of said swing plates being coupled to said clutch to effectuate a disengagement thereof when such swing plate is pivoted downwardly and rearwardly by engagement of one of said legs with the rear abutment means thereof, each of said extensions being dimensionally interrelated with said slots so as to engage said cover to lift it upwardly and rearwardly when the swing plates are pivoted forwardly and downwardly by engagement of said legs with the forward abutment means thereof, said extensions being also dimensionally interrelated with said slots so as to permit withdrawal thereof following such upward and rearward raising of said cover.

3. The structure of claim 2 in which each of said swing plates is equipped with a lock-out arrangement selectively movable between operative and inoperative positions for abutment with said housing when in operative position to limit rearward and downward pivotal movement of the swing plates prior to the disengagement of said clutch thereby.

4. The structure of claim 3 in which each of said lock-out arrangements comprises a generally U-shaped clip movable into a position between said housing and swing plate portion for abutment thereby, and means for maintaining said clip in an inoperative position when moved thereinto.

5. The structure of claim 3 in which each of said lock-out arrangements comprises a pin carried by the swing plate for axial movement between extended and retracted positions, spring means for biasing said pin in a retracted position, and means for maintaining said pin in an extended position against the biasing force of said spring means for abutment with said housing.

6. In a lawn mower, a housing provided with front and rear wheels, an engine carried by said housing, means including a clutch for drivingly connecting said engine to said rear wheels for propelling the lawn mower, a handle structure carried by said housing for pivotal movement between raised and lowered positions, yieldable means connectively arranged with said handle structure for normally maintaining the same in an elevated position but permitting movement of the handle structure to a lowered position when a force in excess of a predetermined magnitude is applied thereagainst, a lever movably mounted in said housing and oriented for actuation by said handle structure when moved to such lowered position, linkage means coupling said lever and clutch for disengaging the clutch upon actuation of said lever, a handle-grip control connected to said linkage means for actuating the same to disengage said clutch, means for returning said clutch to its engaged condition following removal of a prior disengaging actuation applied thereto, and lock-out means for constraining said handle structure against movement thereof into such lowered position to render control of said clutch solely in said handle-grip control therefor.

7. The lawn mower of claim 6 in which said yieldable means comprise coil springs, and in which means are provided for preloading said coil springs to provide selection of the force magnitude necessary to disengage said clutch by movement of the handle structure into such lowered position.

8. In a self-propelled lawn mower, a wheel-equipped housing having a handle structure movably mounted thereon, a power source carried by said housing, connecting means including a clutch for coupling said power source to a pair of said wheels, control means for said clutch coupled to said handle structure for actuation thereby when the handle structure is moved in one direction with respect to said housing for disengaging said clutch, a handle-grip control lever connected to said control means for actuating the same to disengage said clutch independently of movement of said handle structure, and lock-out means arranged with said handle structure to prevent clutch-disengaging movement thereof.

9. In a self-propelled lawn mower having a wheel-equipped housing and an engine clutch-coupled to a pair of said wheels for propelling the lawn mower, means for disengaging such clutch to interrupt the application of engine power to such pair of wheels, comprising a pair of swing plates pivotally mounted on said housing for swinging movement along an arc extending generally from front to rear of said housing, one of said swing plates being arranged with said clutch for disengaging the same when swung rearwardly along such arc beyond a predetermined location, a handle structure comprising a pair of legs each pivotally carried by said housing respectively adjacent said swing plates for movement generally along the same arc of movement thereof, abutment means provided by each of said swing plates for engagement by said legs when the handle structure is swung rearwardly so as to initiate a pivotal movement of the swing plates, spring means normally biasing said swing plates to a position forwardly of said predetermined position, a removable cover on said housing having a pair of elongated slots therein depending extensions on said swing plates projecting through said slots and being freely movable along the longitudinal axes thereof, and forward abutments on said swing plates adapted to be engaged by said legs when said handle structure is pivoted forwardly to effectuate a corresponding forward pivotal movement of said swing plates, said depending extensions being dimensionally interrelated and oriented with respect to said slots for lifting said cover upwardly and rearwardly to remove the same from said housing when said swing plates are swung forwardly and to thereafter permit withdrawal of said extensions from the slots upon further forward movement of said swing plates.

References Cited in the file of this patent

UNITED STATES PATENTS

| | | |
|---|---|---|
| 863,604 | Herzog | Aug. 20, 1907 |
| 2,047,362 | Dunford | July 14, 1936 |
| 2,138,239 | Irgens | Nov. 29, 1938 |
| 2,151,615 | Potter | Mar. 21, 1939 |
| 2,448,074 | Bishop | Aug. 31, 1948 |
| 2,490,171 | Swahnberg | Dec. 6, 1949 |
| 2,564,201 | Hainke | Aug. 14, 1951 |
| 2,564,586 | Smith | Aug. 14, 1951 |
| 2,585,315 | Herman | Feb. 12, 1952 |
| 2,608,102 | Wilkin | Aug. 26, 1952 |
| 2,736,389 | Phelps | Feb. 28, 1956 |
| 2,860,473 | Wehner | Nov. 18, 1958 |